(12) United States Patent
Schnitzer et al.

(10) Patent No.: US 11,255,967 B2
(45) Date of Patent: Feb. 22, 2022

(54) TIME-TO-DIGITAL CONVERTER, LIDAR SYSTEM AND DEVICE

(71) Applicant: Robert Bosch GmbH, Stuttgart (DE)

(72) Inventors: Reiner Schnitzer, Reutlingen (DE); Rene Adams, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 16/349,131

(22) PCT Filed: Oct. 30, 2017

(86) PCT No.: PCT/EP2017/077810
§ 371 (c)(1),
(2) Date: May 10, 2019

(87) PCT Pub. No.: WO2018/086943
PCT Pub. Date: May 17, 2018

(65) Prior Publication Data
US 2019/0277969 A1   Sep. 12, 2019

(30) Foreign Application Priority Data

Nov. 11, 2016   (DE) .......................... 102016222136.1

(51) Int. Cl.
*G01S 17/00* (2020.01)
*G01S 17/14* (2020.01)
(Continued)

(52) U.S. Cl.
CPC ............ *G01S 17/14* (2020.01); *G01S 7/4863* (2013.01); *G01S 7/4865* (2013.01); *G01S 7/497* (2013.01); *G04F 10/005* (2013.01)

(58) Field of Classification Search
USPC ...................................................... 356/5.01
See application file for complete search history.

(56) References Cited

U.S. PATENT DOCUMENTS

| 5,565,982 A | * | 10/1996 | Lee | ........................ | G01J 3/2889 |
| | | | | | 250/458.1 |
| 5,737,077 A | * | 4/1998 | Lee | ........................ | G01J 3/2889 |
| | | | | | 250/458.1 |

(Continued)

FOREIGN PATENT DOCUMENTS

| CA | 2379071 A1 | 9/2002 |
| CN | 101515155 A | 8/2009 |

(Continued)

OTHER PUBLICATIONS

International Search Report dated Feb. 20, 2018 of the corresponding International Application PCT/EP2017/077810 filed Oct. 30, 2017.

*Primary Examiner* — James R Hulka
(74) *Attorney, Agent, or Firm* — Norton Rose Fulbright US LLP; Gerard Messina

(57) ABSTRACT

A time-to-digital converter includes a self-calibrating, n-stage chain of a number n of gate delay elements connected in parallel and series between a clock signal line for supplying a clock signal and a stop signal line for supplying a stop signal; and a charge-pump and phase-detector unit for the feedback control of the gate delay elements, having a first input as a controlled-variable input, a second input as a reference-variable input, and an output as a correcting-variable output. The clock signal line is connected to the first input of the charge-pump and phase-detector unit, a push-pull line for supplying a push-pull signal is connected to the second input, and, for feedback, the gate delay elements are connected to the output of the charge-pump and phase-detector unit.

21 Claims, 2 Drawing Sheets

(51) Int. Cl.
    *G01S 7/4863* (2020.01)
    *G01S 7/4865* (2020.01)
    *G01S 7/497* (2006.01)
    *G04F 10/00* (2006.01)

(56) References Cited

U.S. PATENT DOCUMENTS

| | | | |
|---|---|---|---|
| 9,209,825 | B1 | 12/2015 | Visani et al. |
| 9,442,463 | B2 * | 9/2016 | Seidel ................ G04F 10/005 |
| 9,606,511 | B2 * | 3/2017 | Kurose ............... G04F 10/005 |
| 2015/0177701 | A1 | 6/2015 | Seidel |
| 2016/0274546 | A1 | 9/2016 | Kurose et al. |

FOREIGN PATENT DOCUMENTS

| | | | |
|---|---|---|---|
| CN | 102736511 | A | 10/2012 |
| CN | 105867102 | A | 8/2016 |
| WO | 03088485 | A1 | 10/2003 |
| WO | 2013147883 | A1 | 10/2013 |
| WO | 2013154543 | A1 | 10/2013 |

* cited by examiner

TIME-TO-DIGITAL CONVERTER, LIDAR SYSTEM AND DEVICE

CROSS-REFERENCE TO RELATED APPLICATIONS

The present application is the national stage of International Pat. App. No. PCT/EP2017/077810 filed Oct. 30, 3017, and claims priority under 35 U.S.C. § 119 to DE 10 2016 222 136.1, filed in the Federal Republic of Germany on Nov. 11, 2016, the content of each of which are incorporated herein by reference in their entireties.

FIELD OF THE INVENTION

The present invention relates to a time-to-digital converter, a lidar system and a device using the lidar system and the time-to-digital converter.

BACKGROUND

Time-to-digital converters, which are also referred to as TDC units, are used to measure times or time spans at a high resolution and accuracy and make them available as digital data. This is of high relevance to various applications, with a focus on time-of-flight measurements, for example, in lidar systems.

A problem with conventional time-to-digital converters is that in different applications, stopping events used for self-calibration occur comparatively rarely, which means that in the time between consecutive events, the calibration of a base TDC unit is not retained. This results in measuring errors.

SUMMARY

According to an example embodiment of the present invention, a time-to-digital converter is provided that has an advantage over the related art, that even in the case of comparatively rare stopping events, self-calibration can be achieved and maintained, using simple devices. For example, such a time-to-digital converter is provided, in particular for a lidar system, with at least one self-calibrating, n-stage chain of a number n of gate delay elements, which are connected in parallel and series between a clock signal line for supplying a clock signal and a stop signal line for supplying a stop signal; and having a charge-pump and phase-detector unit for the feedback control of the gate delay elements, including a first input as a controlled-variable input, a second input as a reference-variable input, and an output as a correcting-variable output. In this context, the clock signal line is connected to the first input of the charge-pump and phase-detector unit, and a push-pull line for supplying a continuous push-pull signal is connected to the second input. For feedback, the gate delay elements are connected to the output of the charge-pump and phase-detector unit, for example, via a filter. A push-pull signal applied to the second input in the form of a reference variable input can be supplied continuously to the charge-pump and phase-detector unit via the push-pull line, in order to consequently force a constant self-calibration via the closed loop, independently of the presence or absence of a stopping event on the stop signal line.

A particularly high degree of accuracy of the calibration is established if a selection is made for the push-pull signal in a specially matched form. Thus, in an example embodiment of the time-to-digital converter of the present invention, the push-pull line is configured to supply the clock signal, which is inverse or inverted with respect to the clock signal, as a push-pull signal. To that end, in particular, an inversion or inverter device for inverting the supplied clock signal can be formed at an input.

The gate delay elements provided by the present invention can include various structures.

A particularly simple design is produced according to an example embodiment of the present invention, wherein the time-to-digital converter includes a specific gate delay element that includes a first time-delay element connected in series with or in the clock signal line, a second time-delay element connected in series with or in the stop signal line, and a flip-flop unit connected in parallel between them and in outgoing circuit with the time-delay elements.

In an example embodiment of the time-to-digital converter, a specific flip-flop unit takes the form, for example, of a D flip-flop and includes a data signal input, a clock signal input, and a data signal output. In this context, the data signal input can be connected to the output of an assigned, first time-delay element, and the clock signal input can be connected to the output of an assigned, second time-delay element.

The resulting number n of first time-delay elements can be formed so as to be connected sequentially in series in the clock signal line.

In addition, or as an alternative, the resulting number n of second time-delay elements can be formed so as to be connected sequentially in series in the stop signal line.

The first and second time-delay elements provided can be formed in 1-to-1 correspondence with each other and/or with the resulting number n of flip-flop units.

The push-pull line can be formed in different ways. For example, in one example embodiment, the push-pull line includes a corresponding number n of third time-delay elements connected in series, which are each sequentially assigned to the sequential, second time-delay elements and are coupled to them, in particular, via gate terminals.

In an example embodiment, the second and third time-delay elements are formed in 1-to-1 correspondence with each other, and preferably also with the resulting number n of flip-flop units. This means that the second and third time-delay elements are preferably similar or identical. In an example embodiment, the first time-delay elements are constructed according to a different design, compared to that of the second and third time-delay elements. In particular, time constants T1 of the first time-delay elements and T2 of the second and third time-delay elements can differ from each other.

In order to output an ascertained time value, which is representative of a time or of a time span, then, according to an example embodiment, this is configured with an output bus, which is connected to the data output terminals of the flip-flop devices.

In order to implement the feedback, then, according to an example embodiment, the output of the charge-pump and phase-detector unit is connected to the first time-delay elements as a correcting-variable output, in particular, via a specific control input and/or via a filter.

In this context, to implement the feedback, in particular, the output of the charge-pump and phase-detector unit can be connected, as a correcting-variable output, to ground via a low-pass filter.

In addition, the present invention relates to a lidar system, which includes a time-to-digital converter as described, for determining time of flight.

Furthermore, the present invention also relates to a device and, in particular, a vehicle, preferably, a motor vehicle, which includes a lidar system as described, for determining range and/or for measuring or monitoring the surrounding area.

Example embodiments of the present invention are described in detail with reference to the attached figures, in which identical and equivalent elements and components, as well as elements and components functioning in the same or in an equivalent manner, are denoted by the same reference numerals. The detailed description of the denoted elements and components is not repeated in each case of their appearance. The depicted features and further characteristics can be isolated from each other and combined with each other, as desired, without departing from the essence of the present invention.

DETAILED DESCRIPTION

Figure 1:
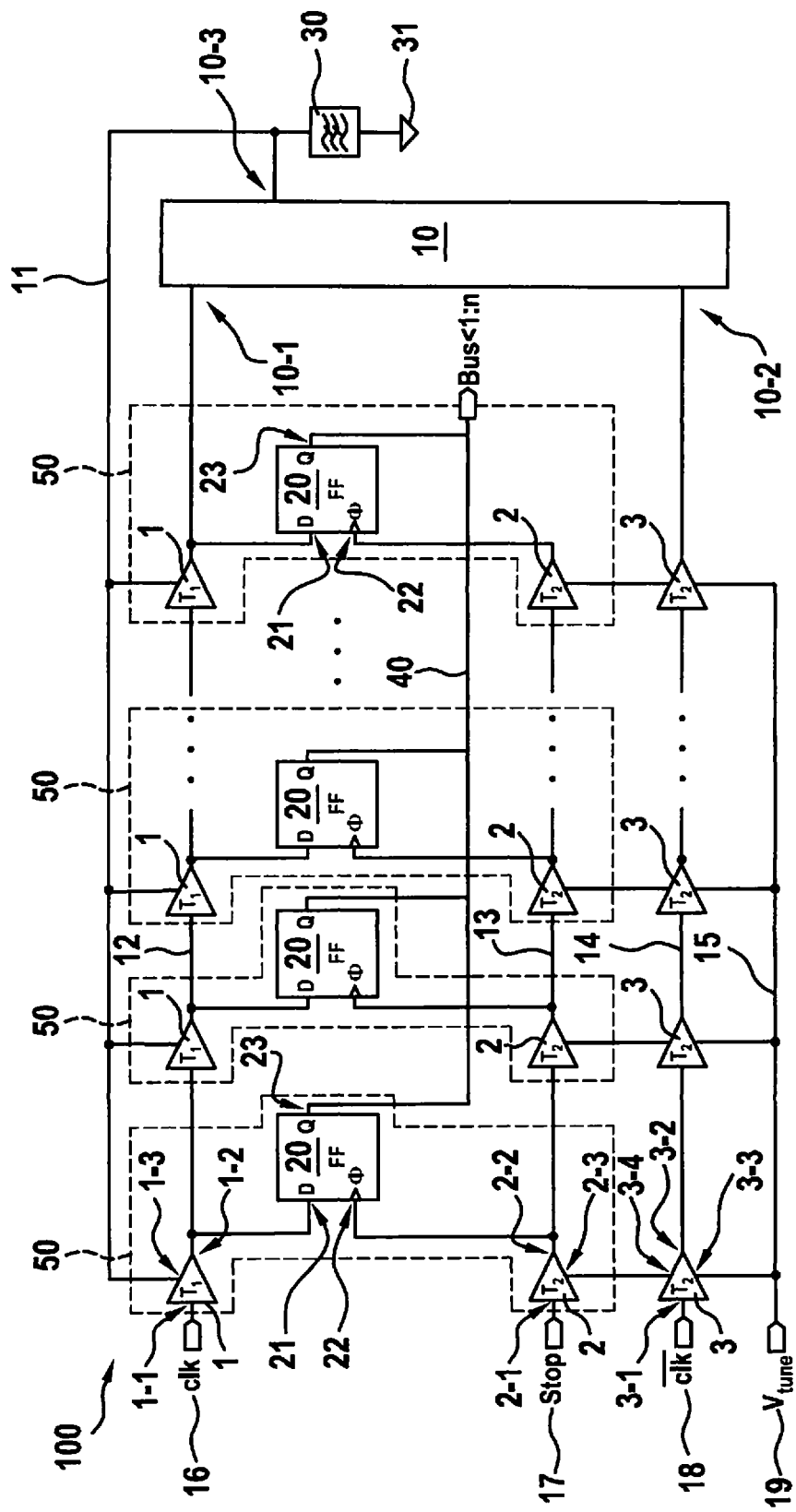
FIG. 1 is a schematic block diagram of a first example embodiment of a time-to-digital converter according to the present invention.

FIG. 1 shows a first example embodiment of the time-to-digital converter 100 of the present invention in the form of a schematic block diagram. The example embodiment of the time-to-digital converter 100 of the present invention shown in FIG. 1 is used for evaluating an individual data source, for example, a single pixel of a lidar system. The time-to-digital converter 100 includes a sequence of a number n of gate delay elements 50 in connection with a clock signal line 12 and a stop signal line 13. Each gate delay element 50 is made up of a first time-delay element 1 having, in this case, a delay time T1, a second time-delay element 2 having, in this case, a delay time T2, which can be, in particular, different from delay time T1, and a flip-flop unit 20, in this case, in the form of a D flip-flop. Thus, corresponding numbers n of first time-delay elements 1 and second time-delay elements 2 are present along with the number n of gate delay elements 50.

First time-delay elements 1 are connected sequentially in series in clock signal line 12. Second time-delay elements 2 are connected sequentially in series in stop signal line 13.

D flip-flops 20 are each assigned to a pair made up of a first time-delay element 1 and a second time-delay element 2; a data terminal 21 of D flip-flop 20 being connected to output 1-2 of an assigned first delay element 1, and clock input 22 of respective D flip-flop 20 being connected to output 2-2 of, in each instance, an assigned second delay element 2. A specific digital output 23 of a D flip-flop 20 is connected to a common output bus 40.

Clock signal line 12 is supplied with clock signal 16 on an incoming side, and is connected to a first input 10-1 of charge-pump and phase-detector unit 10 on the output side, in the form of a controlled-variable input.

In order to implement continuous self-calibration, the present invention provides a push-pull signal line 14, which is supplied a push-pull signal 18, for example, the signal inverted with respect to clock signal 16, on an input side, and which is connected, on the output side, to a second input 10-2 of charge-pump and phase-detector unit 10 in the form of a reference-variable input.

A corresponding number n of third time-delay elements 3 having, in this case, identical delay time T2 are formed in push-pull signal line 14 so as to be connected sequentially in series. In this context, second time-delay elements 2 and third time-delay elements 3 are coupled to each other in 1-to-1 correspondence, in particular, via gate terminals 2-3 and 3-4 of second and third time-delay elements 2, 3, respectively.

To close the feedback loop, output 10-3 of charge-pump and phase-detector unit 10 is connected, as a correcting-variable output, to first time-delay elements 1, in particular, via their gate terminals 1-3. To produce the feedback, correcting-variable output 10-3 of charge-pump and phase-detector unit 10 can advantageously be connected to ground 31 via a low-pass filter 30. The output signal of charge-pump and phase-detector unit 10 is or corresponds to a current signal. This is converted by filter 30 to a voltage signal. In particular, this voltage signal is suited as a control signal of first time-delay elements 1.

In the set-up of time-to-digital converter 100 according to FIG. 1, advantages of the present invention include that, independently of the presence or absence of a stopping event on stop signal line 13, feedback correction of the entire measuring circuit is also implemented continuously via correcting-variable line 11 in outgoing circuit from output 10-3 of charge-pump and phase-detector unit 10, by continuously supplying a push-pull signal 18, in particular, one derived by inverting actual clock signal 16, to the second input of charge-pump and phase-detector unit 10 in the form of a reference-variable input.

The optional control voltage line 15 for supplying a control voltage 19 in connection with second and third time-delay elements 2, 3, via their gate terminals 2-3, 3-3, 3-4, for the purpose of fine tuning, is also represented in FIG. 1.

Figure 2:
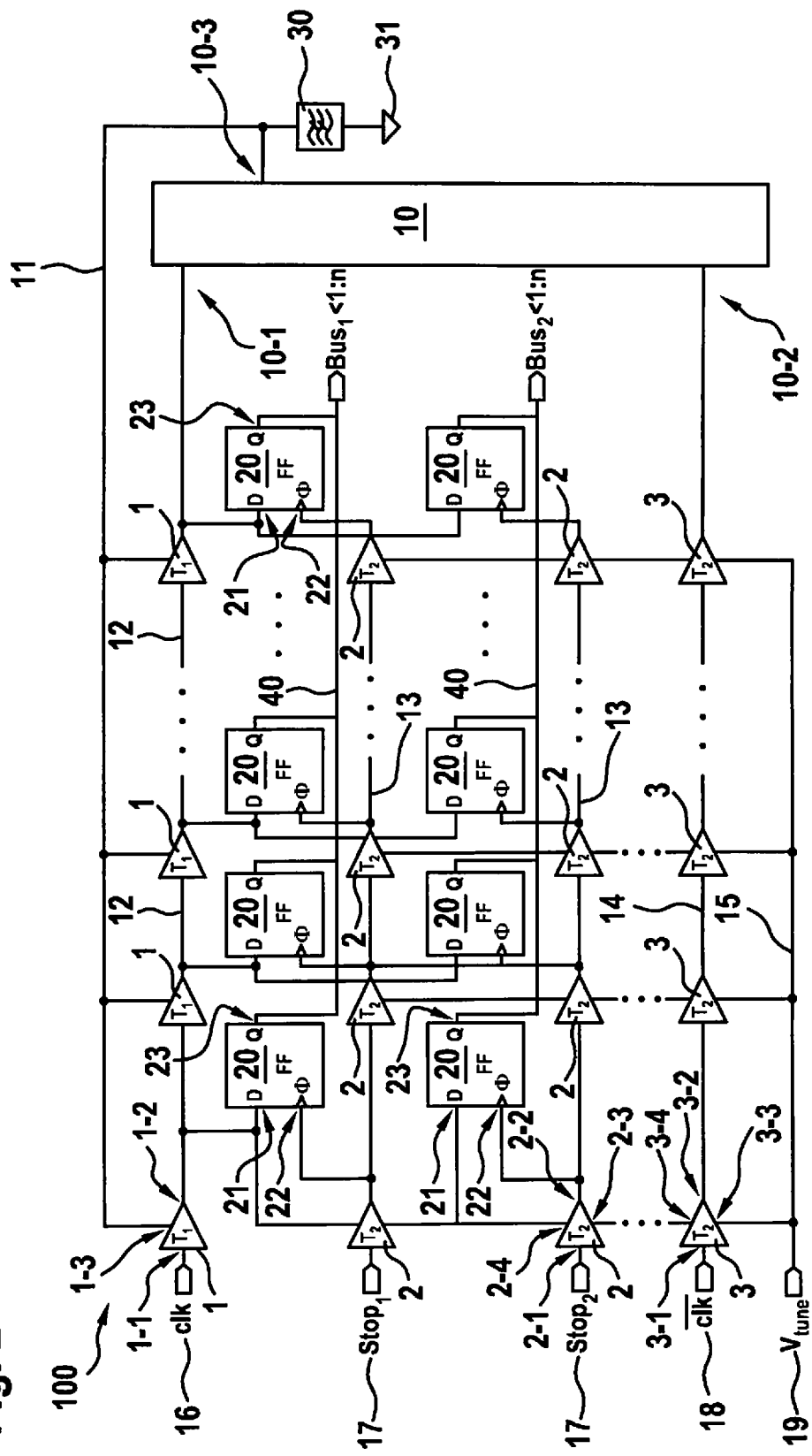
FIG. 2 is a schematic block diagram of another example embodiment of a time-to-digital converter according to the present invention.

FIG. 2 shows an embodiment of a time-to-digital converter 100 of the present invention, which is suitable for a plurality of signal sources, for example, for a plurality of pixels of a base lidar system. To that end, the sequence of the number n of D flip-flops 20, including output bus 40 and including stop signal line 13, is added to again in the corresponding number. In this context, all of the D flip-flops 20 and second time-delay elements 2 are connected to clock signal line 12 on the one side and to push-pull signal line 14 on the other side, in suitable 1-to-1 correspondence with the first and third time-delay elements 1, 3 provided there, so that a common feedback loop is formed via correcting-variable line 11.

Thus, in the case of a lidar system of the present invention, for example, a linear set-up including a plurality of pixels can be read out at an improved accuracy, with a comparatively low expenditure for equipment.

These and additional features and characteristics of the present invention are elucidated further using the following explanations:

For fine resolution, the system design of current time-to-digital converters 100 or TDC's provides an ordinary delay line (DL) or a so-called Vernier delay line (VDL). These are optionally expanded to form closed loops, so that a supposedly constant delay time is established, and consequently, the time span between a stopping event and a next clock event (clk event) can be measured.

In an optical 3-D surrounding-area monitoring system, e.g., in the case of lidar systems, based on direct time-of-flight measurement (direct TOF), the distance resolution and the accuracy are a function of the accuracy of the time measurement.

The existing designs have a deficiency in the accuracy and reproducibility of the time measurement in view of semiconductor process fluctuations, parasitic effects, and disruptive external influences. These reduce and falsify the time resolution and, consequently, the spatial resolution, irreversibly. The disadvantage of the prevailing architecture arises on the basis of the comparatively low repetition rate of the stopping event, which, at the same time, predetermines the maximum correction rate. The system cannot be corrected without a received pulse/signal. Thus, disruptive influences caused by thermal or parasitic effects cannot be compensated for. These limit the time resolution.

In addition, the present system designs for pixel arrays can only be integrated in a surface-area-intensive manner, since a separate control loop is necessary for each pixel. These methods are unable to satisfy the demand for thermally independent and detailed imaging, since the time resolution and the influence of inaccuracy oppose each other in a disproportionate manner.

The designs proposed by the present invention are able to correct for process fluctuations and other deterministic effects, and namely, even if no input signal is present, which means that because of this, a marked improvement in the resolution and the reproducibility is achieved.

According to the present invention, this is achieved by shifting the control loop, which adjusts to a fixed clock-pulse period, is independent of a stopping event, and operates at a defined correction rate. This means that a calibrated system state is already present prior to the occurrence of a stopping event, and that an accurate and reproducible result occurs.

This topology has also proven to be advantageous, since it reduces the circuit-engineering expenditure of a receiver array made up of a plurality of photosensitive structures (APD, SPAD, etc.), as is represented in FIG. 2.

FIG. 1 shows the basic design of the set-up according to the present invention. Simple scalability of the new design is depicted in FIG. 2.

What is claimed is:

1. A time-to-digital converter comprising:
    a self-calibrating, n-stage chain of a number n of gate delay elements that are connected to each other with both a parallel connection and a series connection and that extend from a clock signal line for supplying a clock signal to a stop signal line for supplying a stop signal;
    a push-pull line; and
    a charge-pump and phase-detector unit, wherein the charge-pump and phase-detector unit is configured to perform a feedback control of the gate delay elements and has a first input, which is a controlled-variable input to which the clock signal line is connected, a second input, which is a reference-variable input to which the push-pull line is connected for receiving a push-pull signal, and an output, which is a correcting-variable output to which the gate delay elements are connected for the gate delay elements to obtain a feedback.

2. The time-to-digital converter of claim 1, wherein the feedback is via a filter.

3. The time-to-digital converter of claim 1, wherein the push-pull signal is an inverse of the clock signal.

4. The time-to-digital converter of claim 3, wherein the push-pull line includes an inverter, the inverter being configured to invert the clock signal into the push-pull signal.

5. The time-to-digital converter of claim 1, wherein each of at least one of the gate delay elements includes:
    a respective first time-delay element connected in series between respective sections of the clock signal line;
    a respective second time-delay element connected in series between respective sections of the stop signal line; and
    a respective flip-flop connected to the clock signal line and the stop signal line.

6. The time-to-digital converter of claim 5, wherein the respective flip-flop is arranged to receive input from the respective first time-delay element and from the respective second time-delay element and to produce an output.

7. The time-to-digital converter of claim 5, wherein the respective flip-flop is a D flip-flop that includes a respective data signal input, a respective clock signal input, and a respective data signal output.

8. The time-to-digital converter of claim 7, wherein the respective data signal input is connected to an output of the respective first time-delay element, and the respective clock signal input is connected to an output of the respective second time-delay element.

9. The time-to-digital converter of claim 5, wherein the gate delay elements are arranged so that each of the first time-delay elements corresponds to a respective one of the second time-delay elements.

10. The time-to-digital converter of claim 9, wherein the gate delay elements are arranged so that each of the first time-delay elements corresponds to a respective one of the flip-flops.

11. The time-to-digital converter of claim 5, wherein the gate delay elements are arranged so that each of the first time-delay elements corresponds to a respective one of the flip-flops.

12. The time-to-digital converter of claim 5, wherein the gate delay elements are arranged so that each of the second time-delay elements corresponds to a respective one of the flip-flops.

13. The time-to-digital converter of claim 5, wherein the push-pull line includes third time-delay elements that are connected in series and that are assigned to respective different ones of the second time-delay elements.

14. The time-to-digital converter of claim 13, wherein each of the third time-delay elements is coupled via gate terminals to the respective one of the second time-delay elements to which the respective third time-delay element is coupled.

15. The time-to-digital converter of claim 13, wherein the assignment of the third time-delay elements to the second time-delay elements is according to sequential orders of the respective series connections of the second and third time-delay elements.

16. The time-to-digital converter of claim 5, further comprising an output bus connected to the data output terminals of the flip-flops.

17. The time-to-digital converter of claim 5, wherein to provide the feedback, the output of the charge-pump and phase-detector unit is connected to the first time-delay elements as a correcting-variable output.

18. The time-to-digital converter of claim 5, wherein to provide the feedback, the output of the charge-pump and phase-detector unit is connected as a correcting-variable output to each of the first time-delay elements via at least one of a respective control input and a filter.

19. The time-to-digital converter of claim 5, wherein the output of the charge-pump and phase-detector unit is connected as a correcting-variable output to ground via a low-pass filter.

20. A lidar system comprising a time-to-digital converter via which the lidar system is configured to perform time-of-flight determination, the time-to-digital converter comprising:
- a self-calibrating, n-stage chain of a number n of gate delay elements that are connected to each other with both a parallel connection and a series connection and that extend from a clock signal line for supplying a clock signal to a stop signal line for supplying a stop signal;
- a push-pull line; and
- a charge-pump and phase-detector unit, wherein the charge-pump and phase-detector unit is configured to perform a feedback control of the gate delay elements and has a first input, which is a controlled-variable input to which the clock signal line is connected, a second input, which is a reference-variable input to which the push-pull line is connected for receiving a push-pull signal, and an output, which is a correcting-variable output to which the gate delay elements are connected for the gate delay elements to obtain a feedback.

21. A device comprising a lidar system via which the device is configured to perform at least one of range determination and surrounding-area monitoring, the lidar system comprising a time-to-digital converter via which the lidar system is configured to perform time-of-flight determination, the time-to-digital converter comprising:
- a self-calibrating, n-stage chain of a number n of gate delay elements that are connected to each other with both a parallel connection and a series connection and that extend from a clock signal line for supplying a clock signal to a stop signal line for supplying a stop signal;
- a push-pull line; and
- a charge-pump and phase-detector unit, wherein the charge-pump and phase-detector unit is configured to perform a feedback control of the gate delay elements and has a first input, which is a controlled-variable input to which the clock signal line is connected, a second input, which is a reference-variable input to which the push-pull line is connected for receiving a push-pull signal, and an output, which is a correcting-variable output to which the gate delay elements are connected for the gate delay elements to obtain a feedback.

* * * * *